US011107264B2

(12) United States Patent
Ellis

(10) Patent No.: US 11,107,264 B2
(45) Date of Patent: Aug. 31, 2021

(54) GRAPHICS PROCESSING SYSTEMS FOR DETERMINING BLENDING OPERATIONS

(71) Applicant: Arm Limited, Cambridge (GB)

(72) Inventor: Sean Tristram LeGuay Ellis, Farnham (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/251,611

(22) Filed: Jan. 18, 2019

(65) Prior Publication Data
US 2020/0234484 A1 Jul. 23, 2020

(51) Int. Cl.
*G06T 15/00* (2011.01)
*G06F 9/30* (2018.01)
*G06F 9/44* (2018.01)

(52) U.S. Cl.
CPC ........ *G06T 15/005* (2013.01); *G06F 9/30076* (2013.01); *G06F 9/44* (2013.01)

(58) Field of Classification Search
CPC ...... G06T 15/005; G06F 9/30076; G06F 9/44
See application file for complete search history.

(56) References Cited

U.S. PATENT DOCUMENTS

| 2006/0018558 A1* | 1/2006 | Kuniba | H04N 19/176 382/232 |
| 2006/0071933 A1* | 4/2006 | Green | G06T 15/80 345/426 |
| 2008/0012878 A1* | 1/2008 | Nystad | G06T 11/001 345/613 |
| 2009/0219288 A1* | 9/2009 | Heirich | G06F 11/362 345/426 |
| 2011/0148919 A1* | 6/2011 | Heggelund | G06T 15/005 345/629 |
| 2012/0299943 A1* | 11/2012 | Merry | G06T 15/005 345/589 |
| 2015/0279090 A1* | 10/2015 | Keramidas | G06T 15/503 345/505 |

\* cited by examiner

*Primary Examiner* — Terrell M Robinson
(74) *Attorney, Agent, or Firm* — Vierra Magen Marcus LLP

(57) ABSTRACT

A sequence of instructions is included in a graphics processing shader program for controlling the way in which blending is implemented. The sequence of instructions includes a blend instruction which determines whether blending for a processing item is to be performed by fixed-function blending hardware or by executing a blend shader routine. If blend shading is to be performed, a sequence of instructions for setting up and performing blend shading is executed. If fixed-function blending is to be performed, an execution thread initiates fixed-function blending in response to the blend instruction, and skips over the sequence of instructions for setting up and performing blend shading.

18 Claims, 6 Drawing Sheets

Blend descriptors

| Type | Blending parameters |
|---|---|

| Type = F | Fixed function parameters |
|---|---|

| Type = S | Shader program address or identifier |
|---|---|

Fig. 4

```
pixelShader:    TEXTURE rColor, rS, rT, #TextureIndex
                LOAD rDescriptor, [BlendDescriptor]    ◀ — — — — ┤ S │ Address of blendShader1
                BLEND rColor, rDescriptor, skip
                MOV rABD1, [AdditionalBlendData1]      ◀ — — — — ┤ Additional blend data 1
                MOV rABD2, [AdditionalBlendData2]      ◀ — — — — ┤ Additional blend data 2
                CALL rDescriptor
    skip:       (rest of shader)
                (rest of shader)
                END blendshader1: LOAD rOldColor, [TileBuffer]
                ADD rNewColor, rOldColor, rColor
                ADD rNewColor, rNewColor, rABD1
                MUL rNewColor, rNewColor, rABD2
                STORE [TileBuffer], rNewColor
                RETURN
```

Fig. 6

GRAPHICS PROCESSING SYSTEMS FOR DETERMINING BLENDING OPERATIONS

BACKGROUND

The technology described herein relates to graphics processing systems, and in particular to the operation of graphics processors that can execute "shader" programs to perform graphic processing operations.

Graphics processing is typically carried out in a pipelined fashion, with one or more pipeline stages operating on the data to generate the final render output, e.g. frame that is displayed. Graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

Once the primitives have been generated and defined, they can be processed by the graphics processing system, in order, e.g., to display the frame.

This process basically involves determining which sampling positions in an array of sampling positions covering the output area to be processed are covered by a primitive, and then determining the appearance each sampling position should have (e.g. in terms of its colour, etc.) to represent the primitive at that sampling position. These processes are commonly referred to as rasterising and rendering, respectively.

The rasterising process determines the sample positions that should be used for a primitive (i.e. (the x, y) positions of the sample points to be used to represent the primitive in the output (e.g. frame to be displayed)).

The rendering process then derives the data, such as red, green and blue (RGB) colour values and an "alpha" (transparency) value, necessary to represent the primitive at the sample points (i.e. "shades" each sample point). This can involve applying textures, blending sample point data values, etc.

These processes are typically carried out by testing sets of one, or of more than one, sampling position, and then generating, for each set of sampling positions found to include a sample point that is inside (covered by) the primitive in question (being tested), a discrete graphical entity, which may be referred to as a "fragment", on which the graphics processing operations (such as rendering) are carried out. Covered sampling positions are thus, in effect, processed as fragments that will be used to render the primitive at the sampling positions in question. The fragments are the graphical entities that pass through the rendering process (the rendering pipeline). Each fragment that is generated and processed may, e.g., represent a single sampling position or a set of plural sampling positions, depending upon how the graphics processing system is configured.

Many graphics processing pipelines now include one or more programmable processing stages, commonly referred to as "shaders". These shaders are programmable processing stages that execute shader programs on input data values to generate a desired set of output data for processing by the rest of the graphics pipeline and/or for output. The shaders of the graphics processing pipeline may share programmable processing circuitry, or they may each be distinct programmable processing units.

For example, in a typical graphics processing pipeline, shaders may be used to provide one or more of, and typically all of: geometry shading, vertex shading and fragment (pixel) shading by executing appropriate shader programs. A graphics processor shader may also be used to perform more general processing tasks, e.g. as compute shader by executing a compute shader program.

A graphics processing unit (GPU) shader core is thus a programmable processing unit that performs processing operations by running small programs for each "item" in an output to be generated such as a render target, e.g. frame. An "item" in this regard may be, e.g. a vertex, a fragment (e.g. a pixel), one or more sampling positions, or a compute shader work item.

In graphics shader operation, each "item" will be processed by means of one or more execution threads which will execute the instructions of the shader program in question for the "item" in question. Typically, there will be multiple execution threads each executing at the same time (in parallel).

A shader program to be executed by a given "shader" of a graphics processing pipeline will typically be provided by an application that requires the graphics processing operations using a high level shader programming language, such as GLSL, HLSL, OpenCL, etc. This shader program will typically consist of "expressions" indicating desired programming steps defined in the relevant language standards (specifications). The high level shader program is then translated by a shader language compiler to binary code for the target graphics processing pipeline. This binary code will consist of "instructions" which are specified in the instruction set specification for the given target graphics processing pipeline.

One important and common operation performed in graphics processing is "blending". Blending typically involves taking newly generated e.g. fragment and/or sampling position data (i.e. the results of the fragment shading) and blending it appropriately with data that has previously been generated for the fragment and/or sampling position in question, e.g., that is stored in some output buffer, such as a tile buffer of a tile-based graphics processor, to generate new, modified ("blended") data for the fragment and/or sampling position in question.

The Applicant believes that there remains scope for improvements to the performance of blending operation(s).

BRIEF DESCRIPTION OF THE DRAWINGS

A number of embodiments of the technology described herein will now be described by way of example only and with reference to the accompanying drawings, in which:

FIG. 4 shows the form of a descriptor which may be used by a BLEND instruction of a sequence of instructions in accordance with one embodiment for implementing methods of the technology described herein;

FIG. 6 illustrates the execution of the sequence of instructions when the descriptor is indicative of blend shader implemented blending.

Like reference numerals are used for like components where appropriate in the drawings.

DETAILED DESCRIPTION

Figure 1:
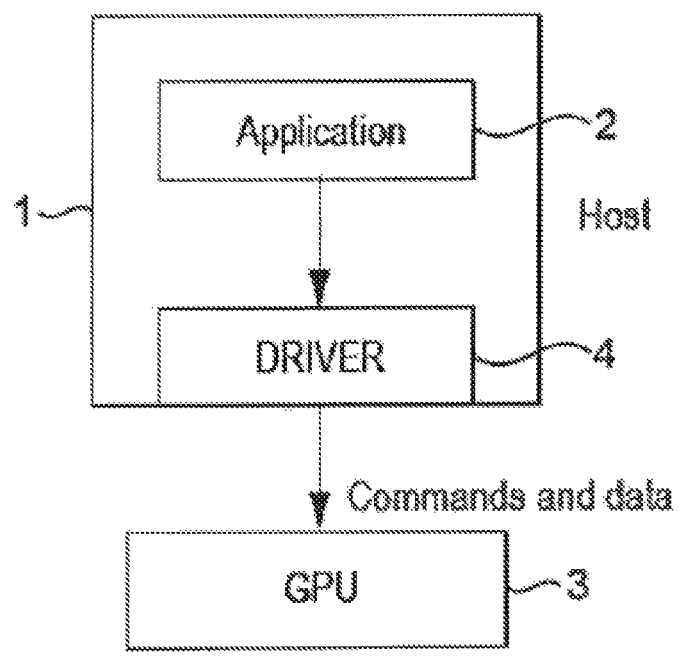
FIG. 1 shows an exemplary graphics processing system which may be operated in accordance with an embodiment of the technology described herein.

One embodiment of the technology described herein comprises a method of operating a graphics processing system that comprises a graphics processor comprising a programmable execution unit operable to execute programs to perform processing operations, and in which system, following operations to generate output data for processing items, blending may be performed for the processing items, wherein blending may be performed either using fixed-function blending hardware of the graphics processor or by the programmable execution unit executing a set of program instructions to implement the blending, the method comprising:

including in a program to be executed by the programmable execution unit of the graphics processor a sequence of blending instructions which, when executed, will cause a blending operation to be performed for a processing item, the sequence of instructions including:

a set of one or more blend operation determining instructions that, when executed, cause a determination of whether a blending operation is to be performed by fixed-function blending hardware or by the programmable execution unit executing a set of program instructions to implement the blending operation and trigger the performance of the blending operation either by fixed-function blending hardware or by the programmable execution unit executing a set of program instructions to implement the blending operation based on the determination; and a set of one or more instructions that, when executed, cause the programmable execution unit to perform a blending operation;

the method further comprising, when the programmable execution unit is executing the program:

determining, in response to the set of one or more blend operation determining instructions, whether the blending operation is to be performed using the fixed-function blending hardware or by the programmable execution unit executing a set of program instructions;

and, when it is determined that the blending operation is to be performed using the fixed-function blending hardware, causing the fixed-function blending hardware of the graphical processor to perform the blending operation for the processing item and then skipping over the set of one or more instructions that, when executed, cause the programmable execution unit to perform a blending operation;

and, when it is determined that the blending operation is to be performed by the programmable execution unit, executing the set of one or more instructions to cause the programmable execution unit to perform the blending operation.

Another embodiment of the technology described herein comprises a graphics processing system, the system comprising:

a graphics processor, the graphics processor comprising:

a programmable execution unit operable to execute programs to perform processing operations;

and fixed-function blending hardware operable to perform blending for processing items following operations to generate output data for the processing items;

the graphics processing system further comprising processing circuitry operable to include in a program to be executed by the programmable execution unit a sequence of blending instructions which, when executed, will cause a blending operation to be performed for a processing item, the sequence of instructions including:

a set of one or more blend operation determining instructions that, when executed, cause a determination of whether a blending operation is to be performed by the fixed-function blending hardware of the graphics processor or by the programmable execution unit executing a set of program instructions to implement the blending operation and trigger the performance of the blending operation either by the fixed-function blending hardware of the graphics processor or by the programmable execution unit executing a set of program instructions to implement the blending operation based on the determination;

and a set of one or more instructions that, when executed, cause the programmable execution unit to perform a blending operation;

wherein, when executing the program, the programmable execution unit will, in response to the sequence of blending instructions:

determine, in response to the set of one or more blend operation determining instructions, whether the blending operation is to be performed using the fixed-function blending hardware of the graphics processor or by the programmable execution unit executing a set of program instructions;

and, when it is determined that the blending operation is to be performed using the fixed-function blending hardware, cause the fixed-function blending hardware of the graphics processor to perform the blending operation for the processing item and then skip over the set of one or more instructions that, when executed, cause the programmable execution unit to perform a blending operation;

and, when it is determined that the blending operation is to be performed by the programmable execution unit, execute the set of one or more instructions to cause the programmable execution unit to perform the blending operation.

The technology described herein in accordance with this further embodiment may include any of the features described in relation to the method embodiment and vice versa. Thus, the methods disclosed herein may include any of the steps that any of the processing circuit/circuitry of the graphics processing system is described as being operable/configured to perform, while any of the processing circuit/circuitry of the system may be operable/configured to perform any of the steps described in relation to the methods.

It will be seen that the graphics processor/graphics processing system includes fixed-function hardware, e.g. one or more fixed-function hardware units, operable to perform blending operation(s). The graphics processor/graphics processing system also supports the performance of blending operation(s) by the programmable execution unit executing a set of program instructions, i.e. an appropriate "blend" shader program. Different types of blending operation may be used to implement different blending modes. For example, fixed-function blending may be used to implement certain simpler and/or more commonly occurring blending operations. Other blending modes (e.g. relating to more complex blending operations) may be implemented using the programmable execution unit.

For ease of reference herein, a blending operation which is implemented by the programmable execution unit executing a set of program instructions (i.e. a shader program) may be referred to as being implemented by "blend shader operation" or "blend shading" (by contrast to a blending operation which is implemented by fixed-function blending hardware, which may be referred to as being implemented by "fixed-function blending operation" or "fixed-function blending").

The technology described herein is concerned with graphics processing program (shader program) execution by a programmable execution unit (shader) of a graphics processor (graphics processing unit (GPU)). In the technology described herein, a set of one or more "blend operation determining" instructions is included in a sequence of instructions (in a shader program), which sequence of instructions may be executed to perform a blending operation. The overall sequence of instructions may be referred to as a sequence of blending instructions. The set of one or more blend operation determining instructions, when executed, causes a determination of whether the blending operation is to be performed using fixed-function blending hardware or by the programmable execution unit executing a set of program instructions (i.e. suitable shader program instructions), and then triggers the applicable type of blending operation.

A blending operation as used herein is an operation in which graphics output data (i.e. newly generated output data) from e.g. shading operations for the processing item (e.g. fragment and/or sampling position) is blended with existing (i.e. previously generated) data from e.g. shading operations for the processing item to generate modified ("blended") output data for the processing item. The existing data for the processing item may be previously stored data e.g. data stored in a tile buffer. For example, a colour value generated for a processing item (in a shading operation) may be blended (i.e. somehow combined) with an existing, e.g. previously stored colour value for the processing item. Another example of the output data which may be blended with existing data is an alpha (transparency) value for the processing item.

A blending operation as referred to herein, whichever implementation is used, is an operation performed following a shading operation to generate output data for a processing item.

The technology described herein may extend to the step of performing the shading operation.

The shading operation may comprise any suitable and desired such operation. The shading operation should at least generate output data, such as colour (e.g. (RGB) and alpha (transparency)) values for the processing item in question. It will be appreciated that the shading operation may involve one or more shading processes.

The shading operation may be performed, e.g., by the same programmable execution unit which executes the sequence of instructions for controlling blending operations described herein, and which is capable of performing (and, in some embodiments, performs) blend shading, or there could be separate programmable execution units that execute programs for performing shading and blending operations respectively. In the former case, there would, in effect, be a common programmable execution unit that may (and, in some embodiments does) perform both shading and blending operations.

The (or, where applicable, each set of) fixed-function hardware referred to herein is dedicated hardware. The fixed-function hardware may be responsive to one or more configuration parameters to modify the dedicated processing operation performed by the fixed-function hardware. Thus, the fixed-function hardware is capable of some variation in the processing it performs, but is not as flexible as a more general purpose processor executing a stream of program instructions.

The blending operations described herein are performed in respect of a processing item. As described above, an "item" in this regard may be, e.g. a vertex, a fragment (pixel), one or more sampling positions, or a compute shader work item. In embodiments the program in which the sequence of instructions is included is a fragment shader program, and the item is a fragment and/or one or more sampling positions. For example, a fragment may represent one or more sampling positions.

In accordance with the technology described herein in any of its embodiments, the programmable execution unit can be any suitable and desired programmable execution unit that a graphics processor (graphics processing unit (GPU)) may contain. The graphics processor may comprise a single or plural programmable execution units. Where there are plural programmable execution units, each execution unit can, in an embodiment, operate in the manner of the technology described herein.

The programmable execution unit can be implemented as desired and in any suitable manner. The programmable execution unit may comprise any suitable programmable hardware element such as programmable processing circuitry (circuit). It may be provided as a separate circuit element to other programmable stages of a graphics processing pipeline. However, it may also be at least partially formed of shared programmable graphics processing circuitry (circuit).

The programmable execution unit can execute any suitable and desired (graphics processing) (shader) program, such as a vertex shader program, a fragment shader program or a compute shader program (e.g. according to OpenCL, or DirectCompute). In embodiments the programmable execution unit executes a fragment shader program. Correspondingly, the programmable execution unit should be able to perform processing operations for any suitable and desired processing items, such as vertices, fragments, primitives and compute shader work items. In an embodiment the programmable execution unit performs processing operations for fragments.

The programmable execution unit (shader) should, and, in an embodiment, does, execute (instructions in) a (the) (shader) program for each processing item (e.g. vertex or fragment or work item) that the programmable execution unit (shader) receives for processing. Each "item" will be processed by means of one or more execution threads which will execute the instructions of the shader program in question for the "item" in question. Typically, there will be multiple execution threads each executing at the same time (in parallel).

The sequence of instructions for performing blending in the technology described herein includes a set of one or more blend operation determining instructions which is executable to determine the type of blending implementation required, and is also arranged to trigger a blending operation in accordance with the applicable type of blending implementation, whichever this may be. Thus, the sequence includes a set of one or more instructions for causing a blending operation to be performed where it is determined that this is to be performed by the programmable execution unit executing a set of program instructions i.e. by blend shading. Additionally, the sequence of instructions is arranged such that, when it is determined, in response to the set of one or more blend operation determining instructions, that the blending operation is to be performed using fixed-function blending hardware, fixed-function blending hardware of the system is caused to perform the blending operation.

A compiled shader program including the sequence of instructions will thus be able to support both fixed-function blending and blend shading operations. Blending in accordance with either type of implementation may therefore be triggered and performed when the program is executed, even if it is not known at compile-time whether fixed-function blending or blend shading operation is required. The applicable type of implementation will be triggered at run-time. The sequence of instructions is therefore a self-contained sequence of instructions which may be used to perform blending in accordance with either type of implementation (at run-time).

In accordance with the technology described herein, the sequence of instructions includes instructions which will enable both implementations of a blending operation to be carried out. However, where it is determined that fixed-function blending is to be used, the sequence of instructions is executable to cause the programmable execution unit to skip over i.e. omit the set of one or more instructions executable to cause the programmable execution unit to perform a blending operation (to perform blend shading). Thus, the set of instructions specific to blend shading is omitted where this is inapplicable. Thus, in accordance with the technology described herein, a relatively simple sequence of instructions may be used to control both possible types of blending operation implementation, in an efficient manner. A set of one or more blend operation determining instructions is executable to determine the type of blending operation required, and then trigger the applicable form of blending operation.

The sequence of blending instructions includes, in order of execution, the set of one or more blend operation determining instructions, and the set of one or more instructions executable to cause the programmable execution unit to perform a blending operation. The set of one or more instructions for causing the programmable execution unit to perform a blending operation may, and, in an embodiment, does, immediately follow the set of one or more blend operation determining instructions in the overall blending instruction sequence. It will be appreciated that the sequence of blending instructions may form a sub-sequence within a longer a sequence of instructions e.g. of an overall shader program. Thus, there may be additional instructions of a shader program before and/or after the sequence of blending instructions.

In an embodiment the set of one or more blend operation determining instructions comprises a set of a plurality of instructions executable to determine the type of blending operation to be performed, and to trigger the applicable type of blending operation.

In an embodiment, the set of one or more blend operation determining instructions comprises a set of one or more instructions executable to obtain data such as a descriptor, indicative of whether the blending operation is to be performed by fixed-function blending hardware or by the programmable execution unit executing a set of program instructions (i.e. by executing a blend shader routine (program)), and to determine, from the data (e.g. descriptor), whether the blending operation is to be performed using fixed-function blending hardware or by the programmable execution unit executing a set of program instructions.

The set of one or more blend operation determining instructions may be executable to obtain the data (e.g. descriptor) in any suitable manner e.g. to load or call the data (e.g. descriptor). For example, an instruction of the set of one or more blend operation determining instructions may have the data (descriptor) indicative of the type of blending operation to be performed as one of its arguments.

The functions of obtaining the data (descriptor), determining from the data (descriptor) the type of blending to be performed, and triggering the applicable type of blending operation, may be implemented by the same or different instructions from among the set of one or more blend operation determining instructions. In embodiments, the set of one or more blend operation determining instructions includes an instruction that obtains (loads) the data (the descriptor), and another (subsequent) instruction that uses the data (descriptor) to determine which type of blending implementation is required, and, in an embodiment, also triggers the applicable type of blending operation.

The data (descriptor) may be obtained from any suitable storage of or accessible to the graphics processor. In embodiments the data (descriptor) is generated and stored before the sequence of instructions is executed. The data (descriptor) is at least indicative of which of the two different types of blending operation is to be performed i.e. fixed-function or blend shading. The data (descriptor) may, for example, also be indicative of one or more parameters which may be used in performing the applicable blending operation.

The set of one or more blend operation determining instructions is executable to trigger the applicable type of blending operation based on the determination of the type of blending operation to be performed. This may be achieved in any suitable and desired manner.

In an embodiment, when it is determined that fixed-function blending is to be used, the set of one or more blend operation determining instructions is executable to send (triggers the sending of) one or more messages to the fixed-function hardware to trigger the performance of the blending operation by the fixed-function hardware. The one or more messages may convey, in any suitable or desired manner, to the fixed-function hardware, information indicative of what kind of blending operation is to be performed, and/or how the blending operation is to be performed. Performing the blending operation may involve the fixed-function blending hardware first setting up and then implementing the blending operation. The fixed-function blending hardware may perform the blending operation using data loaded into storage, such as registers and/or a cache, of the fixed-function hardware or otherwise obtained in response to the one or more messages.

The one or more messages may be indicative of data to be conveyed to the fixed-function blending hardware for use in performing the blending operation. Such data may comprise one or more parameters for use in the fixed-function blending operation, and/or output data for use in the blending operation. The message(s) may include the actual data, and/or indicate in any manner where such data may be obtained. The output data may be colour (e.g. (RGB) and alpha (transparency)) values for the processing item. In some embodiments in which the set of one or more blend operation determining instructions is executable to obtain data (a descriptor) indicative of the type of blending implementation required, where the data (descriptor) is indicative that fixed-function blending is to be performed, the data (descriptor) is additionally indicative of one or more parameters for use in the fixed-function blending process. The one or more messages provided to the fixed-function blending hardware may then be indicative of the data (descriptor), and/or the one or more parameters associated therewith.

The fixed-function blending hardware may be any such hardware which may be caused to perform a blending operation when triggered in response to the set of one or more blend operation determining instructions as described herein. The fixed-function hardware forms part of the graphics processing system/graphics processor. The fixed-function blending hardware may be arranged to perform one or more functions for implementing a blending operation, such as, although not limited to any one or ones of; averaging, adding, subtracting, or filtering (e.g. linear, bilinear or tri-linear filtering). It will be appreciated that there may be, e.g. the graphics processing system/graphics processor may comprise, more than one set of fixed-function blending hardware available for performing different types of blending operation. Thus, the fixed-function hardware which is caused to perform a blending operation may be any available fixed-function hardware capable of performing blending, and may be a one of a plurality of sets of such fixed-function hardware for performing blending. The appropriate fixed-function blending hardware to be used in performing a given blending operation may, for example, be identified using data (the descriptor) that is used to indicate the blending operation to be performed.

When it is determined that the blending operation is to be performed using fixed-function hardware, the method comprises skipping over the set of one or more instructions executable to cause the programmable execution unit to perform a blending (a blend shading) operation (which may, and, in an embodiment, does, constitute a remainder of the sequence of blending instructions). The method may comprise skipping over this set of one or more instructions in response to the set of one or more blend operation determining instructions. The set of one or more blend operation determining instructions may be executable to cause the execution unit to skip over of the set of one or more instructions executable to cause the programmable execution unit to perform a blending operation. In other words, the skip may be encoded in the set of one or more blend operation determining instructions itself. The set of one or more blend operation determining instructions may thus comprise a (conditional) skip operation (i.e. a skip operation that will be performed when it is determined (e.g. based on the blend descriptor) that fixed function blending is to be performed (but not when it is determined that blend shading is to be performed).

In embodiments in which the set of one or more blend operation determining instructions comprises a set of one or more instruction's executable to obtain data e.g. a descriptor, indicative of the type of implementation to be used for the blending operation, the obtained data (e.g. descriptor) may be indicative of the destination of the skip within the overall set of program instructions e.g. shader sequence. This may be an end of the overall program where the end of the sequence of blend instructions corresponds to the end of the overall program, or the next instruction in a remainder of the overall program after the end of the sequence of blend instructions.

In embodiments in which the set of one or more blend operation determining instructions includes an instruction that obtains data (e.g. a descriptor) indicative of the type of blending operation to be performed, and another instruction that uses the data to determine which type of blending implementation is required, and triggers the applicable type of blending operation, this latter instruction (the another instruction) may also be executable to cause the skipping of the set of one or more instructions executable to cause the programmable execution unit to perform a blending operation e.g. may comprise a (conditional) skip operation. Thus, the determined type of implementation for the blending operation, and, in embodiments, the set of one or more blend operation determining instructions itself, dictates the way in which the sequence of blending instructions is traversed.

Where it is determined that blending is to be performed by the programmable execution unit i.e. by blend shading, the set of one or more blend operation determining instructions is arranged to trigger the performance of the blending operation by the programmable execution unit. The set of one or more blend operation determining instructions may be arranged, in response to a determination that the blending operation is to be performed by the programmable execution unit, to trigger performance of the blending operation using blend shading by causing the execution unit to move on to the set of one or more instructions executable to cause the programmable execution unit to perform the blending operation i.e. straight on without triggering fixed-function blending, or performing any steps in relation to fixed-function blending, such as sending a message to the fixed-function blending hardware.

Thus, the performance of the blending operation using blend shading is, in an embodiment, triggered by the programmable execution unit continuing with execution of the overall shader program, and thus the immediately following set of one or more instructions for causing the execution unit to perform the blending operation (rather than skipping those instructions), in the event that execution of the blend operation determining instructions determines that blend shading is to be performed.

The set of one or more instructions for causing the execution unit to perform the blending operation may comprise a set of one or more instructions that, when executed, implement a blending operation. Thus, the set of one or more instructions may itself comprise a sub-routine which may be executed by the execution unit to implement blending. Alternatively, the set of one or more instructions may comprise a set of one or more instructions that, when executed, causes the execution unit to obtain and execute a sub-routine that, when executed, implements a blending operation. For example, the set of one or more instructions may be arranged to cause the execution unit to call (and then execute) the sub-routine. The data (e.g. descriptor) that indicates the blending operation to be performed includes, in an embodiment, a parameter that indicates (identifies) the sub-routine to be executed to perform the blend shading.

A sub-routine executed by the execution unit to implement blending, whether included in the set of one or more instructions executable to cause the execution unit to perform the blending operation, or obtained in response thereto, may comprise any set of one or more instructions which is executable by the programmable execution unit to implement any desired or suitable blending operation. The sub-routine may be arranged to implement a blending operation including any of the functions described in relation to fixed-function blending e.g. any one or ones of; averaging, adding, subtracting, or filtering (e.g. linear, bilinear or tri-linear filtering). However, where the blending operation is performed by the execution unit executing a set of program instructions, more complex functions, or sequences of functions, may be more readily implemented.

It will be appreciated that, in embodiments in which the execution unit is caused to obtain and execute a sub-routine for implementing the blending operation, there may be, and optionally are, a plurality, of sub-routines which may be obtained and executed by the programmable execution unit to implement a blending operation. For example, different sub-routines may be provided for performing blending in accordance with different modes e.g. by performing different arithmetical operations using the existing and newly generated output data. In such embodiments, the method may comprise identifying a sub-routine to be obtained for execution by the programmable execution unit to implement the blending operation from among a plurality of available sub-routines. The sub-routine may be identified using data obtained in response to the set of one or more blend operation determining instructions, e.g. the data (descriptor) which is, in embodiments, obtained and used in determining the type of blending operation to be performed.

For example, the descriptor may identify an address for the sub-routine.

The set of one or more instructions for causing the execution unit to perform the blending operation may, at least in some embodiments, comprise one or more instructions for setting up the blending operation e.g. for setting up the programmable execution unit. It will be appreciated that set-up may not, in all circumstances, be required, and the inclusion of set-up instructions is therefore not essential. The set of one or more instructions for setting up the blending operation may be arranged to cause data to be obtained e.g. loaded for use by the programmable execution unit in implementing the blending operation. Such data may include output data for the processing item in respect of which the blending operation is to be performed. The output data for the processing item may be of any of the forms described above in relation to fixed-function blending. The data may be obtained from any suitable storage e.g. a tile buffer for tile-based implementations. In some embodiments, the set of one or more instructions to cause the execution unit to perform the blending operation comprises one or more instructions for setting up the blending operation, and one or more instructions to cause the execution unit to implement the blending operation once set-up e.g. using data loaded during set-up. The set of one or more instructions to cause the execution unit to implement the blending operation may be of any of the forms described in relation to the set of one or more instructions to cause the execution unit to perform blending i.e. may include a suitable blending sub-routine, or may be arranged to "call" such a sub-routine.

It is envisaged that, where set-up is performed, the way in which set up is performed may differ for different blending operations. For example, different data may be loaded e.g. into the programmable execution unit for use in different blending operations. In such embodiments, the data to be loaded for use in the blending process may be identified in a similar manner to that described in identifying a sub-routine for use in implementing a blending operation e.g. using data e.g. a descriptor obtained in response to the set of one or more blend operation determining instructions.

In embodiments, it will be seen that the set of one or more blend operation determining instructions may, when executed, perform a number of functions, including; determining the type of blending operation to be used, triggering the applicable type of blending operation, and, where appropriate, either causing fixed-function blending to be performed, and then skipping the set of one or more instructions for performing blend shading, or causing the programmable execution unit to perform blend shading. The set of one or more blend operation determining instructions may simply and efficiently cope with either type of blending implementation, and control whichever blending operation is required.

Where blending is to be performed by fixed-function blending, the set of one or more instructions for performing blend shading are skipped. The execution unit is caused to skip to an end of the sequence of blending instructions. When blending is to be performed by the programmable execution unit, after performing the set of one or more instructions for performing blending, the execution unit may reach an end of the sequence of blending instructions. The end of the sequence of blending instructions may or may not correspond to the end of an overall sequence of instructions in the program to be executed, depending upon whether the sequence of blending instructions forms a sub-sequence of a longer sequence of instructions for implementing the program e.g. a shader program. For example, the execution unit may, after skipping or performing the set of one or more instructions for performing blend shading as appropriate, return to a sequence of instructions for implementing shading operations which was being executed prior to execution of the sequence of blending instructions.

The sequence of instructions will typically be included in the (compiled) program by a compiler compiling the program from a high level version of the program (application program code). Correspondingly, the processing circuitry operable to include the instruction in the program is, in an embodiment, a compiler for the programmable execution unit (shader).

The sequence of instructions may be included in the program by the compiler at any suitable stage. In an embodiment the sequence of instructions is included in the program when the compiler determines that a blend operation is required to be performed.

As discussed above, typically a (shader) program will initially be provided using a high level (shader) programming language, such as GLSL, HLSL, OpenCL, C, etc., e.g. by an application executing on the, e.g. host, processor that requires graphics processing operations.

The high level (shader) program will then typically be translated by a (shader language) compiler to a binary code (shader) program including instructions for execution by the programmable execution unit. The compilation process for converting the shader language expressions to binary code instructions may take place via a number of intermediate representations of the program within the compiler. Thus the program written in the high level shader language may be translated into a compiler specific intermediate representation (and there may be several successive intermediate representations within the compiler), with the final intermediate representation being translated into the binary code instructions for the target graphics processing pipeline.

The compiler may, e.g., be part of the driver for the graphics processing unit (GPU) that is executing on an, e.g. host, processor. However, other arrangements would be possible.

The technology described herein also extends to the operation of a compiler including in a program that the compiler is compiling, a sequence of instructions as described herein, in accordance with the technology described herein in any of its embodiments.

Thus, a further embodiment of the technology described herein comprises a method of compiling a program to be executed by a programmable execution unit of a graphics processor, the method comprising:

including in a program to be executed by the programmable execution unit of the graphics processor a sequence of blending instructions which, when executed, will cause a blending operation to be performed for a processing item, the sequence of instructions including: a set of one or more blend operation determining instructions that, when executed, cause a determination of whether a blending operation is to be performed by fixed-function blending hardware of the graphics processor or by the programmable execution unit executing a set of program instructions to implement the blending operation and trigger the performance of the blending operation either by the fixed-function blending hardware or by the programmable execution unit executing a set of program instructions to implement the blending operation based on the determination;

and a set of one or more instructions that, when executed, cause the programmable execution unit to perform a blending operation;

wherein, in response to the sequence of instructions, the programmable execution unit will:

determine, in response to the set of one or more blend operation determining instructions, whether the blending operation is to be performed using the fixed-function blending hardware or by the programmable execution unit executing a set of program instructions;

and, when it is determined that the blending operation is to be performed using the fixed-function blending hardware, cause the fixed-function blending hardware of the graphics processor to perform the blending operation for the processing item and then skip over the set of one or more instructions that, when executed, cause the programmable execution unit to perform a blending operation;

and, when it is determined that the blending operation is to be performed by the programmable execution unit, execute the set of one or more instructions to cause the programmable execution unit to perform the blending operation.

A further embodiment of the present technology described herein comprises a compiler for compiling a program to be executed by a programmable execution unit of a graphics processor, the compiler comprising:

processing circuitry operable to include in a program to be executed by the programmable execution unit a sequence of blending instructions which, when executed, will cause a blending operation to be performed for a processing item, the sequence of instructions including:

a set of one or more blend operation determining instructions that, when executed, cause a determination of whether a blending operation is to be performed by fixed-function blending hardware of the graphics processor or by the programmable execution unit executing a set of program instructions to implement the blending operation and trigger the performance of the blending operation either by fixed-function blending hardware of the graphics processor or by the programmable execution unit executing a set of program instructions to implement the blending operation based on the determination;

and a set of one or more instructions that, when executed, cause the programmable execution unit to perform a blending operation;

wherein, when executing the program, the programmable execution unit will, in response to the sequence of blending instructions:

determine, in response to the set of one or more blend operation determining instructions, whether the blending operation is to be performed using the fixed-function blending hardware or by the programmable execution unit executing a set of program instructions;

and, when it is determined that the blending operation is to be performed using the fixed-function blending hardware, cause the fixed-function blending hardware of the graphical processor to perform the blending operation for the processing item and then skip over the set of one or more instructions that, when executed, cause the programmable execution unit to perform a blending operation;

and, when it is determined that the blending operation is to be performed by the programmable execution unit, execute the set of one or more instructions to cause the programmable execution unit to perform the blending operation.

The technology described herein correspondingly also extends to a graphics processor that is able to operate in the manner of the technology described herein.

Thus, a further embodiment of the technology described herein comprises a graphics processor comprising:

a programmable execution unit operable to execute programs to perform processing operations;

and fixed-function blending hardware operable to perform blending for processing items following operations to generate output data for the processing items;

the programmable execution unit being operable to, in response to a sequence of blending instructions in a program being executed:

determine, in response to a set of one or more blend operation determining instructions in the sequence of blending instructions, whether a blending operation is to be performed using the fixed-function blending hardware of the graphics processor or by the programmable execution unit executing a set of program instructions;

and, when it is determined that the blending operation is to be performed using the fixed-function blending hardware, cause the fixed-function blending hardware of the graphics processor to perform the blending operation for the processing item and then skip over a set of one or more instructions that, when executed, cause the programmable execution unit to perform a blending operation;

and, when it is determined that the blending operation is to be performed by the programmable execution unit, execute a set of one or more instructions to cause the programmable execution unit to perform the blending operation in the sequence of blending instructions.

A further embodiment of the technology described herein comprises a method of operating a graphics processor that comprises:

a programmable execution unit operable to execute programs to perform processing operations;

and fixed-function blending hardware operable to perform blending for processing items following operations to generate output data for the processing items;

the method comprising:

the programmable execution unit, when executing a program:

determining, in response to a set of one or more blend operation determining instructions in the program, whether a blending operation is to be performed using the fixed-function blending hardware or by the programmable execution unit executing a set of program instructions;

and, when it is determined that the blending operation is to be performed using the fixed-function blending hardware, causing the fixed-function blending hardware of the graphics processor to perform the blending operation for the processing item and then skipping over a set of one or more instructions that, when executed, cause the programmable execution unit to perform a blending operation;

and, when it is determined that the blending operation is to be performed by the programmable execution unit, executing a set of one or more instructions to cause the programmable execution unit to perform the blending operation in the program.

As will be appreciated by those skilled in the art, these further embodiments of the technology described herein may include any one or more or all of the features described herein, as appropriate.

The technology described herein can be implemented in any suitable system, such as a suitably configured microprocessor based system. In an embodiment, the technology described herein is implemented in a computer and/or micro-processor based system.

The technology described herein is applicable to any form or configuration of graphics processor, such as graphics processors having a "pipelined" arrangement (in which case the graphics processor comprises a rendering pipeline).

As will be appreciated by those skilled in the art, the graphics processor of the technology described herein may be part of an overall graphics processing system that includes, e.g., a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The graphics processor may also comprise, and/or be in communication with, one or more memories and/or memory devices that store the data described herein, and/or the output data generated by the graphics processor, and/or store software (e.g. (shader) program) for performing the processes described herein. The graphics processor may also be in communication with a host microprocessor, and/or with a display for displaying images based on the data generated by the graphics processor.

As well as any programmable processing (shader) stages, such as a vertex shader and fragment shader, the graphics processor and pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processor may output. Thus, it may be used when generating frames for display, render-to-texture outputs, etc. The output data values from the graphics processor is, in an embodiment, exported to external, e.g. main, memory, for storage and use.

The technology described herein is applicable to any suitable form or configuration of graphics processor. It is particularly applicable to tile-based graphics processors and graphics processing systems. Thus in an embodiment, the graphics processing system and graphics processor are a tile-based system and pipeline, respectively.

In an embodiment of the technology described herein, the various functions of the technology described herein are carried out on a single graphics processing platform that generates and outputs the rendered item data that is, e.g., written to the frame buffer for the display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, unless otherwise indicated, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, nontransitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Some embodiments of the technology described herein will now be described with reference to the Figures.

FIG. 1 shows schematically a typical computer graphics processing system.

An application 2, such as a game, executing on a host processor 1 will require graphics processing operations to be performed by an associated graphics pipeline that is implemented by means of a graphics processing unit (GPU) 3. To do this, the application will generate API (Application Programming Interface) calls that are interpreted by a driver 4 for the graphics processor that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
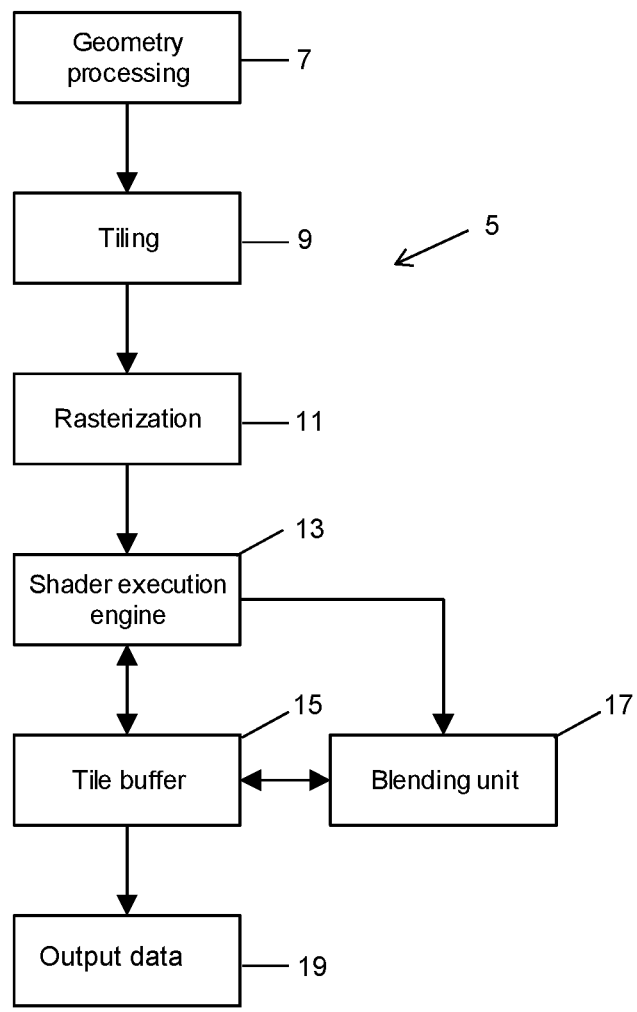
FIG. 2 shows schematically an arrangement of a graphics processor that can be controlled in accordance with the technology described herein.

FIG. 2 shows an exemplary graphics pipeline 5 which may be executed by the graphics processor 3. The graphics processing pipeline 5 shown in FIG. 2 is a tile-based graphics processing pipeline, and will thus produce tiles of a render output data array, such as an output frame to be generated.

As shown in FIG. 2, the graphics processing pipeline 5 includes a geometry processing stage 7, a tiling stage 9, a rasterisation stage (a rasteriser) 11, a shader execution engine 13 that performs fragment shading operations, a tile buffer 15, and a fixed-function hardware unit, (the "blending unit" 17), that performs blending operations. The pipeline 5 produces an output render data array 19. The output render data array 19 may typically be output render data (an image) for a frame intended for display on a display device, such as a screen or printer, but may also, for example, comprise intermediate render data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering i.e. shading in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processor 3. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, the graphics pipeline 5 includes a geometry processing stage 7 which defines the graphics primitives (polygons). The tiling stage 9 performs the process of "tiling" to allocate the defined primitives to primitive lists which are then used to identify the primitives that should be rendered for each tile that is to be rendered to generate the output data (which in this embodiment is a frame to be rendered for display). For example, the tiling stage may be implemented using a primitive list building unit which takes as its input transformed and processed vertex (geometry) data from the geometry processing stage 7 e.g. from a programmable vertex shader (i.e. the positions of the primitives in the frame), builds primitive lists using that data, and stores those lists as the primitive lists in a memory.

The rasterization stage 11 takes as its input a primitive and its vertices, rasterises the primitive to fragments, and provides those fragments to the shader execution engine 13. The shader execution engine 13 is a programmable execution unit that performs fragment shading by executing fragment shading software routines (programs) for fragments received from the rasterizer 11.

Each graphics "fragment" that is shaded may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image. While, for simplicity, reference is made herein to "fragment" shading, the functions described in relation to a "fragment" may be performed in relation to any suitable processing item. Thus the term "fragment" may be replaced by "processing item", unless the context demands otherwise. A processing item may be e.g. a vertex, one or more sampling positions, one or more pixels, or a compute shader work item.

Each fragment will be processed by means of one or more execution threads which will execute the instructions of the shader program in question for the fragment in question. Typically, there will be multiple execution threads each executing at the same time (in parallel).

Once the fragment shading operations have been completed, the relevant fragment shading output data is subjected to a blending operation. Such blending blends (merges) the newly generated fragment data with previously generated data for the corresponding fragment positions (or for the corresponding sample positions which the fragment represents) in some way. This previously generated data may have been generated by previously processed fragments, be a background colour, etc. In the present embodiment, the previously generated data is shown stored in and read from a tile buffer 15 (as the graphics processing system a tile-based graphics processing system). Other arrangements would, of course, be possible.

In the present embodiment the graphics processor can carry out the blending either by means of executing a blend shading software routine in the shader execution engine 13, or by using the fixed function, dedicated processing hardware blending unit 17. (Thus, in the embodiment illustrated, the blend shading software routine and fragment shading are both implemented using the shader execution engine 13. However, it will be appreciated that this need not be the case.) The hardware blending unit 17 is operable to perform a fixed subset of common blending operations.

The system may be used to implement a range of different blending modes. Some blending modes may be more advantageously implemented using fixed-function blending. For example, fixed-function blending may enable certain more common blending operations to be performed more efficiently and faster than if the same operation were to be performed using a blend shader i.e. by providing an appropriate set of blend-shading instructions. Conversely, if it is desired to implement more complex blending operations, it may be more appropriate to do so using the blend shader by executing suitable shader program instructions to perform the blending operation using the programmable execution unit (engine) 13.

In the embodiment of FIG. 2, it may be seen that both the shader execution engine 13 and the blending unit 17 have access to the tile buffer 15.

The mechanism for controlling which form of blending will be used, and how the subsequent blending operation is performed, will be described in more detail by reference to FIGS. 3 and 4.

Figure 3:
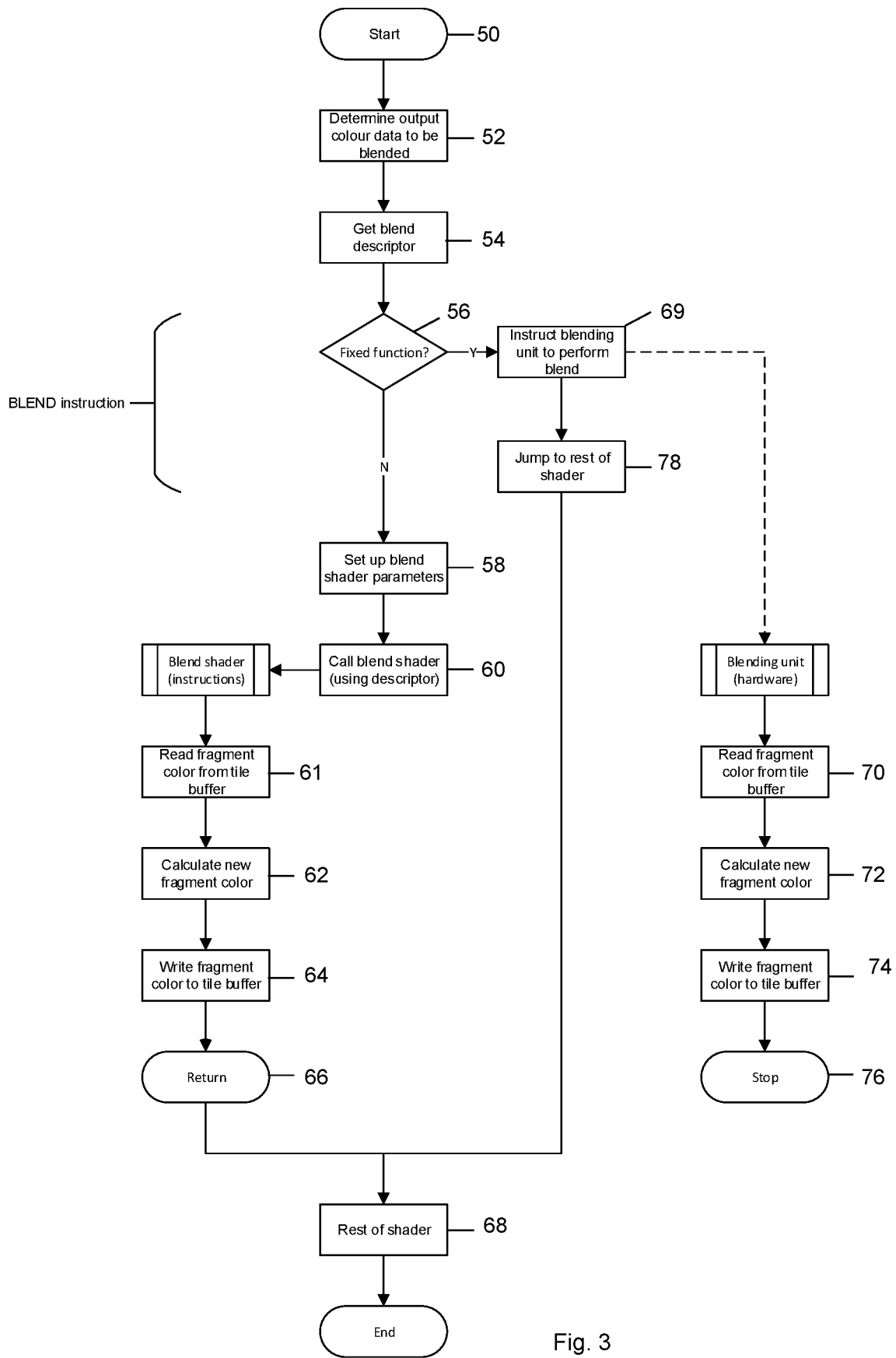
FIG. 3 is a flow chart illustrating one embodiment of the operation of the graphics processor when controlled using a sequence of instructions according to the technology described herein.

FIG. 3 is a flow chart illustrating the functional steps resulting from execution of a program which may be used to control blending operation in accordance with one embodiment of the technology described herein using a graphics pipeline as shown in FIG. 2.

The process starts at step 50. In step 52 the shader execution engine 13 performs a fragment shading operation to determine an output colour value for a fragment. This output colour value will be blended with an existing colour value for the applicable fragment stored in the tile buffer 15. The output colour value may be obtained in any suitable manner. For example, typically texturing and lighting calculations are performed. The shading operation is implemented by the shader execution engine performing a suitable shading software routine e.g. executing an appropriate shading program i.e. sequence of instructions.

The shader execution engine 13 then executes a sequence of (blending) instructions for controlling which form of blending will be used, and how the blending operation is to be performed.

The sequence of instructions includes a first set of instructions (the blend operation determining instructions) that, when executed, cause a determination of whether a blending operation for a processing item is to be performed by fixed-function blending hardware or by the shader execution engine executing a set of program instructions (implementing steps 54 and 56), and then triggers the applicable type of blending operation. The sequence of instructions includes a second set of instructions executable to cause the shader execution engine to perform a blending operation (implementing steps 58-66). The second set of instructions includes one or more instruction for setting up the blend shader if blend shading is to be used i.e. for implementing step 58, and one or more instruction for causing the blend shader to perform the blending operation i.e. calling up the appropriate sub-routine in step 60 and then performing the sub-routine in steps 61-66.

The set of blend operation determining instructions includes a first instruction for obtaining a blend descriptor indicative at least of the type of blending operation to be performed, and a second instruction (a "BLEND instruction") for determining the type of blending operation to be performed using the blend descriptor. The BLEND instruction also triggers the applicable type of blending operation. If blend shading is to be performed, the BLEND instruction causes the execution engine to move on to step 58 for setting up the blend shader. If fixed function blending is to be performed, the BLEND instruction triggers fixed function blending and then cases the execution unit to skip over the second set of instructions which are specific to blend shading.

The sequence of instructions therefore includes all the necessary instructions to enable a blending operation to be performed by either a fixed-function or blend shading process as required. However, where fixed-function blending is to be used, the steps specific to blend shading are skipped.

FIG. 4 indicates possible forms that the blend descriptor may take. The blend descriptor may be indicative of a type of implementation of the blending operation to be used, and one or more blending parameters for the blending process. For example, a type "F" blend descriptor may indicate that fixed-function blending is to be used. The blending descriptor may then be indicative of parameters to be used in the fixed function blending operation. A type "S" blend descriptor may indicate that blend shading is to be used to implement the blending operation. The descriptor may be indicative of the address or other identifier of a sub-routine (shader program) to be executed to perform the blend shading.

Returning to FIG. 3, in response to the set of blend operation determining instructions, a blend descriptor for the blending operation will first be loaded—step 54. At step 56, in response to a BLEND instruction of the set of blend operation determining instructions, the blend type field in the obtained blend descriptor will be checked to determine whether the blending operation is to be implemented using fixed function blending or blend shading.

If blending is to be performed by the blend shader, i.e. through a sub-routine performed by the shader execution engine 13, the BLEND instruction causes the execution engine to move on to step 58, in which set-up of any additional parameters required for the blend shader is performed. The execution engine then proceeds to step 60 and calls a blend shader sub-routine to be executed by the execution engine to implement a blending operation. As will be described in more detail below, one of a number of possible blending sub-routines may be identified for use and called for implementing a desired blending operation. The sub-routine to be used may be identified using a parameter included in the blend descriptor.

By way of example, the blend shading sub-routine performed by the shader execution engine 13 may include steps 61-66. In step 61, an existing colour value for the fragment is read from the tile buffer 15. In step 62 a new colour value for the fragment is obtained by performing a blending operation using the existing and new colour values for the fragment. The new colour value for the fragment is the value calculated in step 52. This may be performed in any suitable manner. In step 64 the fragment colour obtained using the blend shading operation is written to the tile buffer 15 for output. The process according to this sub-routine ends at step 66, with the execution engine returning to the main shader program, and performing any remainder thereof (step 68).

If, in step 56 it is determined that fixed function blending is to be used, in response to the BLEND instruction, the execution engine causes the fixed-function blending unit 17 to perform a blending operation—step 69.

For example, the execution engine may send an appropriate message (command) to the fixed function blending unit 17 to trigger that unit to perform a blending operation.

The blending operation performed by the fixed function blending unit 18 may comprise, as shown in FIG. 3, first, in step 70, reading an existing colour value for the fragment from the tile buffer 15. Then, in step 72 a new colour value for the fragment is obtained by the blending unit 17 performing a blending operation using the existing and new colour values for the fragment. The new colour value for the fragment is the value calculated in step 52. This may be performed in any suitable manner. In step 74 the fragment colour obtained using the blending operation is written to the tile buffer 15 for output. The process ends at step 76, e.g. with the fixed function blending unit indicating the completion of its operation to the execution engine 13 so the execution of the main shader program can be resumed/continued.

The execution engine then performs a jump (step 78) to return to a remainder of the main shader program at step 68. As shown in FIG. 3, in this case, the execution engine jumps (step 78) straight on to perform any remainder of the main shader program—step 68. Thus, steps 58-66 for setting up the blend shader and performing blend shading are omitted, as these are not applicable where fixed function blending is performed. The destination of the jump 78 may be indicated by the blend descriptor.

The destination of the jump performed in step 78 or the location to which the execution engine returns at step 66 in the cases of fixed-function or blend shading respectively may be set by the compiler. It will be appreciated that there may be no remaining steps of the main shader to be performed, in which case the jump/return may be to the end of the main shader program.

Figure 5:
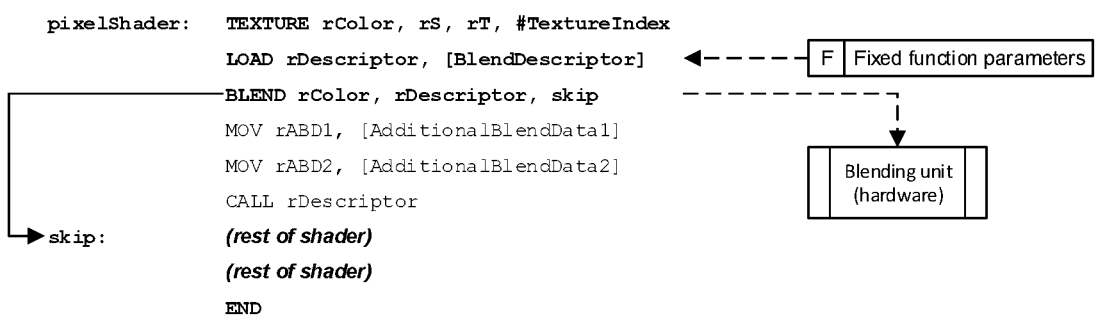
FIG. 5 illustrates a sequence of instructions which may be used to control the graphics processor to operate as described by reference to FIG. 3, illustrating the execution of the sequence of instructions when the descriptor is indicative of fixed-function blending.

FIG. 5 shows one example of a sequence of instructions which may be used to implement blending in accordance with the embodiment illustrated in the FIG. 3 flowchart, with reference to the way in which the sequence of instructions is traversed in the case in which fixed-function blending is to be used. Register arguments and destinations are indicated by names beginning with "r", and parameters between brackets [ . . . ].

Execution by an execution thread starts at the label "pixelShader".

The new colour value for a fragment is determined by the shader execution engine. This is implemented by the execution thread executing a TEXTURE fragment shading instruction. The execution thread stores the resulting colour value in a register "rColor". This implements step 52 of FIG. 3. It will be appreciated that shading may be performed in any suitable manner, and while a texturing operation is used in FIG. 5, this is merely exemplary. The technology described herein relates to the way in which blending is controlled, and more specifically, how the sequence of instructions may implement and select between either fixed-function or blend shader blending operations.

A "LOAD" instruction causes the execution thread to load a blend descriptor for the blending operation from a memory into a register "rDescriptor"—(implementing step 54 of FIG. 3).

A "BLEND" instruction is then executed by the execution thread to determine the type of the blend descriptor (implementing step 56 of FIG. 3). Together the LOAD and BLEND instructions provide a set of blend operation determining instructions. In this example, it is determined that the descriptor is fixed-function (Type=F). In response to the "BLEND" instruction, the execution thread passes the descriptor, (which is indicative of the parameters to be used in implementing fixed-function blending), and the colour value for the fragment stored in rColor, to the fixed-function blending unit 17—(implementing step 69 of FIG. 3), for use by the fixed-function blending unit in performing a blending operation e.g. as shown in FIG. 3.

The execution thread now skips to the remainder of the main shading program (implementing step 78 of FIG. 3). This is caused by the "skip" command in the BLEND instruction. The sub-routines in the sequence of instructions for setting up and implementing a blend shading process which would be performed in the case of blend shading (i.e. if the type of the descriptor indicated blend shading rather than fixed function blending), are skipped (the "MOV" and "CALL" instructions shown in FIG. 5). Any remaining steps of the main shading program, up to an END instruction, will then be performed.

FIG. 6 illustrates the way in which the sequence of instructions is traversed when, instead, it is determined that blending is to be implemented by the shader execution engine i.e. blend shading. Register arguments and destinations are again indicated by names beginning with "r", and parameters between brackets [ . . . ].

Execution by an execution thread starts at the label "pixelShader".

The TEXTURE, LOAD and BLEND instructions are executed by the thread in the manner previously described by reference to FIG. 5. However, in the case of FIG. 6, when executing the BLEND instruction, it is determined that the descriptor is of the blend shader type (Type=S). The descriptor is also indicative of an address for a sub-routine to be used to perform blend shading.

At this point, traversal of the sequence of instructions by the execution thread differs to the case in which the descriptor is indicative of a fixed-function blending operation as in FIG. 5.

When a type S descriptor is detected, the execution thread passes through to the next instruction.

There are two MOVE instructions (MOV) which cause the execution thread to load additional blend data from memory for setting up the blend shading process (implementing step 58 of FIG. 3). The execution thread now moves on to the CALL instruction, which calls up a sub-routine for performing the blending process (implementing step 60 of FIG. 3). The two MOVE instructions and the CALL instruction provide a set of instructions executable to cause the execution unit to perform a blending operation. The sub-routine may be seen in FIG. 6. The address for this sub-routine ("blendshader1") is obtained from the descriptor. The execution thread then performs the ("blendshader1") sub-routine. In response to the LOAD command, the existing fragment colour is loaded from the tile buffer (step 61 in FIG. 3). The blending operation is then performed to obtain a new i.e. blended fragment colour based on the existing fragment colour and the output colour data value for the fragment to be blended as determined in response to the TEXTURE instruction (implementing step 62 of FIG. 3). In FIG. 6, the blending operation is implemented through execution of the two ADD commands and a MUL command. However, any type of blending operation may be used, involving any arbitrary arithmetic, and the particular operation shown in FIG. 6 is merely exemplary.

In response to the STORE instruction, the resulting new (blended) fragment colour value is written to the tile buffer (implementing step 64). The RETURN instruction then causes the execution engine to return to a point just beyond the point of the sub-routine CALL instruction (implementing step 66 of FIG. 3), and any remainder of the shader program, up to an END instruction, is then executed, as in the fixed function case described by reference to FIG. 4.

Thus, by using a sequence of instructions of the type illustrated in FIGS. 5 and 6, the way in which blending is performed, and whether fixed-function blending or blend shading is used, is controlled. This control is provided by means of the set of blend operation determining instructions, which may be executed to perform a number of functions. The set of blend operation determining instructions causes the execution engine to obtain and identify a type of a blend descriptor. If fixed function blending is indicated by the descriptor, the BLEND instruction of the set of blend operation determining instructions will cause the execution engine to initiate fixed-function blending, and to skip to any remainder of the main shader program. If the descriptor indicates that blending is to be performed by the blend shader, the BLEND instruction causes the execution engine to use the obtained descriptor to identify a sub-routine to be used to perform the blend shading, perform the sub-routine, and then return to any remainder of the main shader program.

In this way, in embodiments of the technology described herein at least, the sequence of instructions enables the compiled shader program to support both fixed-function and blend shading blending operations. Thus, either type of blending may be performed as required, even where it is not known at compile-time whether fixed-function or blend shader implemented blending will be required. The need to set up any blend shading operation is avoided where the blend shader will not be used. The set of blend operation determining instructions may provide a relatively simple set of instructions which may control both possible forms of blending operation.

It will be appreciated that additional flow control operations may be incorporated in the process shown in FIG. 3, and thus in the sequence of instructions shown in FIGS. 5 and 6 for implementing the process. For example, where there are data dependencies, appropriate rules may be applied to take these into account e.g. to result in waiting occurring at appropriate points.

The foregoing detailed description of the technology described herein has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical application, to thereby enable others skilled in the art to best utilise the technology described herein in various embodiments and with various modifications as are suited to the particular use contemplated. It is intended that the scope of the technology described herein be defined by the claims appended hereto.

What is claimed is:

1. A method of operating a graphics processing system that comprises a graphics processor comprising a programmable execution unit operable to execute programs to perform processing operations, and in which, following operations to generate output data for processing items, blending may be performed for the processing items, wherein blending may be performed either using fixed-function blending hardware of the graphics processor or by the programmable execution unit executing a set of program instructions to implement the blending, the method comprising:

including in a program to be executed by the programmable execution unit of the graphics processor a sequence of blending instructions which, when executed, will cause a blending operation to be performed for a processing item, and a set of one or more further instructions, the sequence of blending instructions including:

a set of one or more blend operation determining instructions that, when executed, cause a determination of whether a blending operation is to be performed by fixed-function blending hardware or by the programmable execution unit executing a set of program instructions to implement the blending operation and trigger a performance of the blending operation either by fixed-function blending hardware or by the programmable execution unit executing a set of program instructions to implement the blending operation based on the determination;

and a set of one or more instructions that, when executed, cause the programmable execution unit to perform a blending operation;

wherein the set of one or more blend operation determining instructions comprises a skip operation that, when executed by the programmable execution unit when it is determined that the blending operation is to be performed using the fixed-function blending hardware and the fixed-function blending hardware is caused to perform the blending operation, causes the programmable execution unit to skip over the set of one or more instructions that, when executed, cause the programmable execution unit to perform a blending operation, and to perform a jump to a remainder of the program to then execute the set of one or more further instructions;

the method further comprising, when an execution thread of the programmable execution unit is executing the program:

determining, in response to the set of one or more blend operation determining instructions, whether the blending operation is to be performed using the fixed-function blending hardware or by the programmable execution unit executing a set of program instructions;

and, when it is determined that the blending operation is to be performed using the fixed-function blending hardware, causing the fixed-function blending hardware of the graphics processor to perform the blending operation for the processing item and the execution thread then skipping over the set of one or more instructions that, when executed, cause the programmable execution unit to perform a blending operation, to perform a jump to a remainder of the program to then execute the set of one or more further instructions;

and, when it is determined that the blending operation is to be performed by the programmable execution unit, the execution thread executing the set of one or more instructions to cause the programmable execution unit to perform the blending operation and then executing the set of one or more further instructions.

2. The method of claim 1 wherein the set of one or more blend operation determining instructions comprises a set of one or more instructions executable to obtain data indicative of whether the blending operation is to be performed by the fixed-function blending hardware or by the programmable execution unit executing a set of program instructions, and to determine, from the data, whether the blending operation is to be performed using fixed-function blending hardware or by the programmable execution unit executing a set of program instructions.

3. The method of claim 2 wherein the set of one or more blend operation determining instructions includes an instruction that obtains the data, and another instruction that uses the data to determine which type of blending implementation is required, and triggers the applicable type of blending operation.

4. The method of claim 1 wherein, when it is determined that fixed-function blending is to be used, the set of one or more blend operation determining instructions is executable to send one or more messages to the fixed-function hardware to trigger the performance of the blending operation by the fixed-function hardware.

5. The method of claim 1 wherein, when it is determined that the blending operation is to be performed using fixed-function hardware, the method comprises the execution thread skipping over the set of one or more instructions executable to cause the programmable execution unit to perform a blending operation in response to the set of one or more blend operation determining instructions.

6. The method of claim 1 wherein the set of one or more blend operation determining instructions, when executed, and in response to a determination that the blending operation is to be performed by the set of one or more blend operation determining instructions, triggers performance of the blending operation by causing the execution unit to move on to the set of one or more instructions executable to cause the programmable execution unit to perform the blending operation.

7. The method of claim 1 wherein the set of one or more instructions, that, when executed, cause the execution unit to perform the blending operation comprises one or more instructions for setting up the blending operation, and one or more instructions to cause the execution unit to implement the blending operation once set-up.

8. The method of claim 7 wherein the one or more instructions for setting up the blending operation cause data to be loaded for use by the programmable execution unit for use in implementing the blending operation.

9. The method of claim 1 wherein the set of one or more instructions that, when executed, cause the execution unit to perform the blending operation comprise a set of one or more instructions that, when executed, implement a blending operation.

10. The method of claim 1 wherein the set of one or more instructions that, when executed, cause the execution unit to perform the blending operation comprise a set of one or more instructions that, when executed, cause the execution unit to execute a sub-routine that, when executed, implements a blending operation.

11. The method of claim 10 further comprising identifying a sub-routine to be obtained for execution by the programmable execution unit to implement the blending operation from among a plurality of available sub-routines.

12. The method of claim 11 wherein the sub-routine is identified using data obtained in response to the set of one or more blend operation determining instructions.

13. A graphics processing system, the system comprising:
a graphics processor, the graphics processor comprising:
a programmable execution unit operable to execute programs to perform processing operations;
and fixed-function blending hardware operable to perform blending for processing items following operations to generate output data for the processing items;
the graphics processing system further comprising processing circuitry operable to include in a program to be executed by the programmable execution unit a sequence of blending instructions which, when executed, will cause a blending operation to be performed for a processing item, and a set of one or more further instructions, the sequence of blending instructions including:
a set of one or more blend operation determining instructions that, when executed, cause a determination of whether a blending operation is to be performed by the fixed-function blending hardware of the graphics processor or by the programmable execution unit executing a set of program instructions to implement the blending operation and trigger a performance of the blending operation either by the fixed-function blending hardware of the graphics processor or by the programmable execution unit executing a set of program instructions to implement the blending operation based on the determination;
and a set of one or more instructions that, when executed, cause the programmable execution unit to perform a blending operation;
wherein the set of one or more blend operation determining instructions comprises a skip operation that, when executed by the programmable execution unit when it is determined that the blending operation is to be performed using the fixed-function blending hardware and the fixed-function blending hardware is caused to perform the blending operation, causes the programmable execution unit to skip over the set of one or more instructions that, when executed, cause the programmable execution unit to perform a blending operation, and to perform a jump to a remainder of the program to then execute the set of one or more further instructions; and
wherein the programmable execution unit of the graphics processor is configured to, in response to the sequence of blending instructions in a program being executed by an execution thread of the programmable execution unit:
determine, in response to the set of one or more blend operation determining instructions, whether the blending operation is to be performed using the fixed-function blending hardware of the graphics processor or by the programmable execution unit executing a set of program instructions;

and, when it is determined that the blending operation is to be performed using the fixed-function blending hardware, cause the fixed-function blending hardware of the graphics processor to perform the blending operation for the processing item and the execution thread to then skip over the set of one or more instructions that, when executed, cause the programmable execution unit to perform a blending operation, to perform a jump to a remainder of the program to then execute the set of one or more further instructions;

and, when it is determined that the blending operation is to be performed by the programmable execution unit, cause the execution thread to execute the set of one or more instructions to cause the programmable execution unit to perform the blending operation and then executing the set of one or more further instructions.

14. The graphics processor of claim 13 wherein the set of one or more blend operation determining instructions comprises a set of one or more instructions executable to obtain data indicative of whether the blending operation is to be performed by the fixed-function blending hardware or by the programmable execution unit executing a set of program instructions, and to determine, from the data, whether the blending operation is to be performed using fixed-function blending hardware or by the programmable execution unit executing a set of program instructions.

15. The graphics processor of claim 14 wherein the set of one or more blend operation determining instructions includes an instruction that obtains the data, and another instruction that uses the data to determine which type of blending implementation is required, and triggers the applicable type of blending operation.

16. The graphics processor of claim 13 wherein, when it is determined that the blending operation is to be performed using fixed-function hardware, and in response to the set of one or more blend operation determining instructions, the execution thread of the programmable execution unit skips over the set of one or more instructions executable to cause the programmable execution unit to perform a blending operation.

17. A non-transitory computer readable storage medium storing computer software code which when executed on a data processor performs a method of compiling a program to be executed by a programmable execution unit of a graphics processor, the method comprising:

including in a program to be executed by the programmable execution unit of the graphics processor a sequence of blending instructions which, when executed, will cause a blending operation to be performed for a processing item, and a set of one or more further instructions, the sequence of blending instructions including:

a set of one or more blend operation determining instructions that, when executed, cause a determination of whether a blending operation is to be performed by fixed-function blending hardware of the graphics processor or by the programmable execution unit executing a set of program instructions to implement the blending operation and trigger a performance of the blending operation either by the fixed-function blending hardware or by the programmable execution unit executing a set of program instructions to implement the blending operation based on the determination;

and a set of one or more instructions that, when executed, cause the programmable execution unit to perform a blending operation;

wherein the set of one or more blend operation determining instructions comprises a skip operation that, when executed by the programmable execution unit when it is determined that the blending operation is to be performed using the fixed-function blending hardware and the fixed-function blending hardware is caused to perform the blending operation, causes the programmable execution unit to skip over the set of one or more instructions that, when executed, cause the programmable execution unit to perform a blending operation, and to perform a jump to a remainder of the program to then execute the set of one or more further instructions; and wherein, in response to the sequence of instructions being executed by an execution thread of the programmable execution unit, the programmable execution unit will:

determine, in response to the set of one or more blend operation determining instructions, whether the blending operation is to be performed using the fixed-function blending hardware of the graphics processor or by the programmable execution unit executing a set of program instructions;

and, when it is determined that the blending operation is to be performed using the fixed-function blending hardware, cause the fixed-function blending hardware of the graphics processor to perform the blending operation for the processing item and then cause the execution thread to skip over the set of one or more instructions that, when executed, cause the programmable execution unit to perform a blending operation, to perform a jump to a remainder of the program to then execute the set of one or more further instructions;

and, when it is determined that the blending operation is to be performed by the programmable execution unit, cause the execution thread to execute the set of one or more instructions to cause the programmable execution unit to perform the blending operation and then executing the set of one or more further instructions.

18. A graphics processor comprising:

a programmable execution unit operable to execute programs to perform processing operations;

and fixed-function blending hardware operable to perform blending for processing items following operations to generate output data for the processing items;

the programmable execution unit being operable to, in response to a sequence of blending instructions in a program being executed by an execution thread of the programmable execution unit:

determine, in response to a set of one or more blend operation determining instructions in the sequence of blending instructions, whether a blending operation is to be performed using the fixed-function blending hardware of the graphics processor or by the programmable execution unit executing a set of program instructions, wherein the set of one or more blend operation determining instructions comprises a skip operation that, when executed by the programmable execution unit when it is determined that the blending operation is to be performed using the fixed-function blending hardware and the fixed-function blending hardware is caused to perform the blending operation, causes the programmable execution unit to skip over the set of one or more instructions that, when executed, cause the programmable execution unit to perform a blending operation, and to perform a jump to a remainder of the program to then execute the set of one or more further instructions;

and, when it is determined that the blending operation is to be performed using the fixed-function blending hardware, cause the fixed-function blending hardware of the graphics processor to perform the blending operation for the processing item and the execution thread to then skip over a set of one or more instructions that, when executed, cause the programmable execution unit to perform a blending operation, to perform a jump to a remainder of the program to then execute a set of one or more further instructions in the program being executed;

and, when it is determined that the blending operation is to be performed by the programmable execution unit, cause the execution thread to execute a set of one or more instructions to cause the programmable execution unit to perform the blending operation in the sequence of blending instructions and then executing the set of one or more further instructions in the program being executed.

\* \* \* \* \*